Dec. 11, 1951  A. PERRAULT  2,578,590

SAFETY VALVE

Filed Feb. 25, 1948

INVENTOR.
Ainslie Perrault
BY
C. M. McKnight

Patented Dec. 11, 1951

2,578,590

UNITED STATES PATENT OFFICE 2,578,590

SAFETY VALVE

Ainslie Perrault, Tulsa, Okla., assignor to Perrault Bros., Tulsa, Okla., a corporation of Delaware Application February 25, 1948, Serial No. 10,685

3 Claims. (Cl. 277—43)

This invention relates to valves, and more particularly, but not by way of limitation, to safety valves for use in fluid flow lines of any type, especially large diameter pipes.

It is well known that any sudden stoppage of fluid flowing in a long pressure pipe or conduit usually caused by the closing of a valve, particularly if the rate of closure is such to prevent a building up of fluid inertia in a retrograde direction to cause the conduit or pipe to be subjected to a sharp hammerlike blow from a steep front pressure wave thereby causing what is known as hydraulic knock or water hammer.

The present invention is generally concerned with a safety valve normally retained in open position due to the pressure of fluid acting against one side thereof, however, when the direction of the fluid flow is changed for any reason, such as a line break or shutting off of the fluid flow, the valve is caused to have a rapid seating action. The present valve provides for an alleviation of the hydraulic shock or hammer by a cushioning or hydraulic seating of the valve, as well as an auxiliary relief valve, simultaneously permitting the pressure of the fluid flow in its reverse direction to bleed therethrough.

It is an important object of this invention to provide a safety valve for flow lines which will minimize hydraulic shock or pressure surge resulting in a change in pressure or direction of the fluid moving through the flow line.

And still another object of this invention is to provide a safety valve for flow lines adapted to close rapidly whereby the speed of closing substantially prevents any change in the direction of fluid flow.

Another object of this invention is to provide a safety valve for flow lines, which is hydraulically cushioned to preclude the shock from slamming in the closing operation, and thus preclude any development of stresses beyond the allowable limit of the valve structure, and simultaneously providing a flexible support arm to overcome any possible eccentricity in the seating and thus assure a tight closure of the valve.

And still another object of this invention is to provide a safety valve for flow lines having a spring loaded relief valve for relieving excess pressure that would be occasioned by a valve closing to create hydraulic shock.

And still another object of this invention is to provide a safety valve for flow lines having a spring cushioned seat adapted to absorb the shock of a quick seating or closing and thus eliminate any chatter or distortion resulting from fluctuations of velocity. Furthermore, said valve is provided with a spring to substantially absorb any shocks of a quick opening in like manner.

And still another object of this invention is to provide a safety valve rotatably supported by ball thrust bearings, thereby permitting rapid and efficient movement of the valve in an open or closed relation. Furthermore the valve is simple and inexpensive to manufacture, durable and economical in operation.

Other objects and advantages of the invention will be evident from the following detailed description, read in conjunction with the accompanying drawings, which illustrate my invention.

Figure 1:
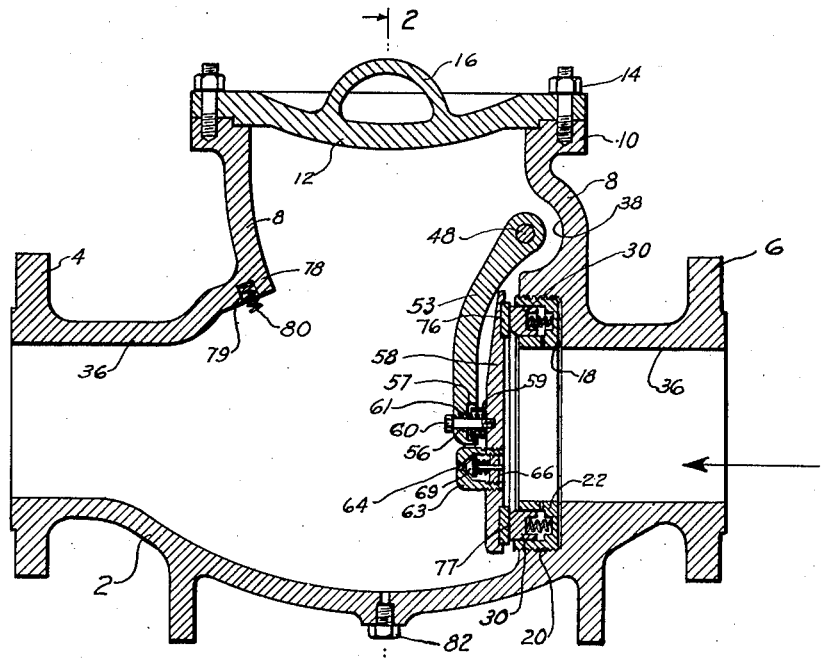
Figure 1 is a sectional elevational view showing the valve in closed position.

Referring to the drawings in detail reference character 2 designates a valve body having suitable end flanges 4 and 6 adapted to be interposed in a flow line in any suitable manner (not shown). A circular upstanding flange 8 is provided in the upper part of the body 2 and in turn is provided with outwardly disposed flanges 10 supporting the valve bonnet 12 secured thereto by the bolts 14. A handle 16 is provided on the bonnet. The body 2 is provided with a cutaway portion or recess 18 having threads 20 in which is disposed a circular valve seating ring 22 shown in detail in Figure 3. The seating ring 22 is provided with a recess 24 communicating with a smaller recess 26. A port or passageway 28 communicates with the bore or recess 24.

A circular landing ring 30 is freely disposed in the recess 24. The landing ring is provided with a centrally disposed recess 32 in alignment with the recess 26. A helical spring 34 is anchored in the recesses 26 and 32 to provide a flexible and resilient disposition of the landing ring 30 in the recess 24. Furthermore, the passageway 28 provides communication between the recess 24, and fluid normally present in the bore 36 of the valve body 2, thereby providing a hydraulic compression chamber in the bore 24 acting against the landing ring 30 for a purpose as will be hereinafter set forth.

Figures 2, 3:
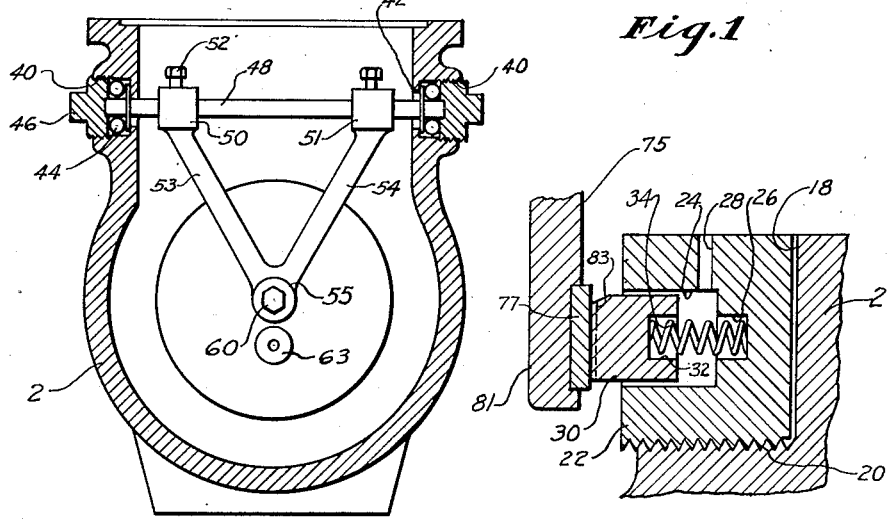
Figure 2 is a sectional view taken on lines 2—2 of Figure 1.
Figure 3 is a fragmentary sectional view showing a detail of the cushioned seat for the valve.
Figure 4:
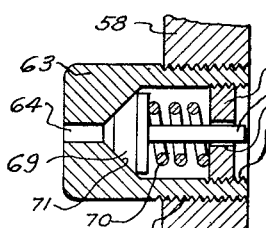
Figure 4 is a detail view of the auxiliary relief valve.

The upstanding flange 8 is formed with a cutaway portion 38 in alignment with a pair of diametrically opposed threaded apertures 40 having a flange portion 42 forming shoulders. A ball thrust bearing 44 is disposed against the shoulders 42 in each aperture 40 and maintained therein by a threaded nut 46. A freely rotatable shaft 48 is supported by the bearings 44 as shown in Figure 2. The shaft is provided with a pair of horizontally spaced bearing members 50 and 51 secured thereon by set screws 52. Each of the bearings 50 and 51 are provided with angularly extending leg members 53 and 54 diverging into a bearing member 55 having a bore 56 communicating with a smaller bore 57.

A circular valve disc 58 is provided with an upstanding flange 59 disposed in the recess 56 and secured to the disc 58 by a bolt 60. A helical spring 61 encircles the bolt 60 to provide a flexible or cushioned connection between the valve disc and the journal member 55. The valve disc 58 is provided with a threaded aperture 62 in which is disposed a tubular member 63 having an inlet aperture 64 communicating with a threaded bore 65 of larger diameter. A threaded bracket 66 is disposed in the bore 65, and is provided with an aperture 67 in which is disposed a valve stem 68 of a relief valve 69. A helical spring 70 encircles the stem 68 between the spider 66 and valve 69 and normally maintains the valve 69 in seating relation with the tapered portions 71 of the tubular housing 63 to close the inlet opening 64.

The seating face 75 of the valve disc 58 is provided with a circular recess 76 in which is disposed a seating ring 77 adapted to cooperate with the landing ring 30 in a manner as will be hereinafter set forth.

The flange 8 at a point diametrically opposite the recess 38 is provided increased body portion 78 having a recess 79 in which is disposed a helical spring 80 adapted to act as a spring shock absorber contacting the end portion 81 of the valve when in open position (not shown). A drain plug 82 is provided in the lowermost portion of the body 2.

Operation

In operation the valve is normally maintained in an open position (not shown) by the pressure of the fluid flowing in the direction of the arrow as shown in Figure 1. The shock of any quick opening of the valve 58 is absorbed by the helical spring 80 thereby eliminating valve chatter and any resultant fluctuation of fluid velocity. The valve will be maintained in full open position (not shown) as long as the flow direction in the flow line is maintained. Furthermore the valve is permitted to open to an extent to permit any passage of pipe cleaning apparatus or the like (not shown) normally used for the cleaning of all abrasives and debris from the flow line. The pivotable movement of the shaft 48 in the thrust bearings 44 provides for ease and rapidity of movement of the valve disc between its open or closed position. When the valve is in a closed position as shown in Figure 1, the flexible arrangement of the securing bolt 60 with the valve disc 58 allows for a slight variation of the valve seating ring 77 with the landing ring 30, and thereby compensates for any eccentricity in the seating relationship.

The safety valve will be moved from an open position to a closed position rapidly, particularly when the pressure of the fluid against the face 75 is diminished such as is created by a line break, or a shutting off of the flow. The speed of the valve in closing is to prevent any change in fluid direction or flow. With the valve closed, the seating ring 77 contacts the landing ring 30 to provide the seating relationship. The hydraulic compression chamber 26 plus the resiliency of the spring 34 will permit a cushioning action during the seating of the valve disc 58 in order to prevent any chattering or shock from a slamming of the valve which would tend to distort or rupture the valve structure. The pressure of fluid against the closed valve disc 58 will act against the auxiliary relief valve 69 to open the port 64 and permit a bleeding of the fluid pressure therethrough and thus provide for an alleviation of any hydraulic shock due to pressure surge or the like.

Furthermore, the landing ring 30 may be provided with a plurality of spaced transversely disposed V-shaped grooves 83 as indicated in Figure 3, which allows fluid to spill therethrough and thereby assist the cushioning action between the landing ring and the seating ring 77.

From the foregoing, it will be apparent that the present invention provides a safety valve which is capable of a rapid opening or closing action, without any undue chattering or distortion from the shock of slamming, having a tendency to fracture the valve structure. Furthermore, the rapid closing of the valve due to a change in flow direction substantially alleviates any pressure surge or the like normally causing hydraulic shock or fluid hammer; however, any fluid hammer that may be set up is substantially diminished through an auxiliary relief valve cooperating with the main valve. It will be apparent that the construction of the valve is such to provide an extremely rapid closure thereof due to any stoppage of line flow, and such valve closing is done before any fluid flow reversal can occur, for substantially eliminating any increased fluid inertia tending to cause a hydraulic or fluid hammer.

Changes may be made in the specifications and drawings without departing from the spirit of the invention within the scope of the following claims, as set forth.

What I claim is:

1. In a safety valve adapted to be interposed in a fluid line and comprising a body, a circular seating ring threadedly secured in the valve body, a recess provided in the seating ring, a movable landing ring disposed in the recess, resilient means cooperating between the landing ring and the recess to provide a cushioning of the landing ring relative to the seating ring, a port providing fluid communication between the recess and the interior of the valve body, a main valve disc pivotably secured to the body and adapted to seat against the landing ring in closed position, means for anchoring the valve disc providing compensation for eccentricity in the seating relationship, and means providing alleviation of fluid pressure against one side of the valve disc in closed position.

2. In a safety valve adapted to be interposed in a fluid line and comprising a body, a circular-shaped seating ring secured in the valve body, an annular recess provided in the seating ring, a movable landing ring disposed in the annular recess, resilient means cooperating between the landing ring and the annular recess to provide a cushioning of the landing ring relative to the seating ring, a main valve disc pivotally secured to the body and adapted to seat against the landing ring in closed position, and ports providing restricted communication between the interior of the valve body and the closed end of the annular recess to provide outlets for fluid from the annular recess upon movement of the landing ring in one direction.

3. In a safety valve adapted to be interposed in a fluid line and comprising a body, a circular-shaped seating ring secured in the valve body, an annular recess provided in the seating ring, a movable landing ring disposed in the annular recess, resilient means cooperating between the landing ring and the annular recess to provide a cushioning of the landing ring relative to the seating ring, a main valve disc pivotally secured to the body and adapted to seat against the landing ring in closed position, ports providing restricted communication between the interior of the valve body and the closed end of the annular recess to provide outlets for fluid from the annular recess upon movement of the landing ring in one direction, and means for anchoring the valve disc providing a compensation for eccentricity in the seating relationship of the valve disc on the landing ring.

AINSLIE PERRAULT.

REFERENCES CITED

The following references are of record in the file of this patent:

UNITED STATES PATENTS

| Number | Name | Date |
|---|---|---|
| 948,404 | Webb | Feb. 8, 1910 |
| 1,044,234 | Parre | Nov. 12, 1912 |
| 1,049,123 | Mercer | Dec. 31, 1912 |
| 1,200,306 | Bryce | Oct. 3, 1916 |
| 1,545,995 | Andrew | July 4, 1925 |
| 1,752,456 | Pillatt | Apr. 1, 1930 |
| 1,777,580 | Russell | Oct. 7, 1930 |
| 2,030,458 | McKellar | Feb. 11, 1936 |

FOREIGN PATENTS

| Number | Country | Date |
|---|---|---|
| 608,964 | Germany | of 1936 |